US011905035B2

(12) United States Patent
Jha et al.

(10) Patent No.: US 11,905,035 B2
(45) Date of Patent: Feb. 20, 2024

(54) AIRCRAFT LIGHT, AIRCRAFT, AND METHOD OF ASSEMBLING AN AIRCRAFT LIGHT

(71) Applicant: Goodrich Lighting Systems Gmbh & Co. KG, Lippstadt (DE)

(72) Inventors: Anil Kumar Jha, Lippstadt (DE); Andre Hessling von Heimendahl, Koblenz (DE); Andreas Ueberschaer, Gütersloh (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/163,087

(22) Filed: Feb. 1, 2023

(65) Prior Publication Data
US 2023/0264831 A1 Aug. 24, 2023

(30) Foreign Application Priority Data
Feb. 23, 2022 (EP) .................................... 22158246

(51) Int. Cl.
*B64D 47/06* (2006.01)
*F21S 43/20* (2018.01)
(Continued)

(52) U.S. Cl.
CPC ............ *B64D 47/06* (2013.01); *B60Q 1/2615* (2013.01); *B64D 45/08* (2013.01); *B64D 47/02* (2013.01);
(Continued)

(58) Field of Classification Search
CPC ...... F21V 17/104; F21V 17/16; F21V 17/162; F21V 17/164; F21V 17/166;
(Continued)

(56) References Cited

U.S. PATENT DOCUMENTS 5,539,628 A * 7/1996 Seib .......................... F21V 9/20
362/255
5,593,223 A * 1/1997 Koizumi ............... F21V 19/002
362/255
(Continued)

FOREIGN PATENT DOCUMENTS

EP 2985229 2/2016
EP 3584171 12/2019
(Continued)

OTHER PUBLICATIONS

European Patent Office, European Search Report dated Jul. 21, 2022 in EP Application No. 22158246.3.

*Primary Examiner* — Alexander K Garlen
(74) *Attorney, Agent, or Firm* — SNELL & WILMER L.L.P.

(57) ABSTRACT

An aircraft light comprises a support board; a light source, arranged on the support board; a first optical element, which is at least partially light transmissive, which is arranged over the light source, and which is fixed to the support board; and a second optical element, which is at least partially light transmissive, wherein the first optical element is interposed between the light source and the second optical element. The first optical element has a first engagement portion and the second optical element has a second engagement portion. The first engagement portion and the second engagement portion establish a positive fit between the first optical element and the second optical element. At least a portion of light, which is emitted by the light source in operation, passes through the first optical element and through the second optical element.

15 Claims, 4 Drawing Sheets

(51) Int. Cl.
 *B60Q 1/26* (2006.01)
 *B64D 45/08* (2006.01)
 *B64D 47/02* (2006.01)
 *F21V 17/16* (2006.01)
 *B64D 11/00* (2006.01)
(52) U.S. Cl.
 CPC .............. *F21S 43/26* (2018.01); *F21V 17/16* (2013.01); *B60Q 2800/30* (2022.05); *B64D 2011/0038* (2013.01); *B64D 2011/0053* (2013.01); *B64D 2203/00* (2013.01)
(58) Field of Classification Search
 CPC ... F21V 17/168; B64D 2203/00; B64D 47/02; B64D 47/04; B64D 47/06; B64D 2011/0038
 See application file for complete search history.

(56) References Cited

U.S. PATENT DOCUMENTS

| | | | |
|---|---|---|---|
| 10,362,657 B2 | 7/2019 | Hessling-Von Heimendahl et al. | |
| 10,788,170 B1* | 9/2020 | Bryan | G02B 7/022 |
| 10,946,564 B2 | 3/2021 | Revol et al. | |
| 2019/0016473 A1* | 1/2019 | Depta | F21V 5/045 |
| 2019/0144132 A1 | 5/2019 | Jha et al. | |
| 2020/0331629 A1* | 10/2020 | Hessling-von Heimendahl | F21S 10/06 |

FOREIGN PATENT DOCUMENTS

| | | |
|---|---|---|
| EP | 3725687 | 10/2020 |
| EP | 3738889 | 11/2020 |
| WO | WO-2017098383 A1 * | 6/2017 |

* cited by examiner

AIRCRAFT LIGHT, AIRCRAFT, AND METHOD OF ASSEMBLING AN AIRCRAFT LIGHT

CROSS-REFERENCE TO RELATED APPLICATIONS

This application claims priority to, and the benefit of, EP Application No. 22158246.3, filed Feb. 23, 2022 and entitled "AIRCRAFT LIGHT, AIRCRAFT, AND METHOD OF ASSEMBLING AN AIRCRAFT LIGHT," which is incorporated by reference herein in its entirety for all purposes.

FIELD

The present invention is in the field of aircraft lights. In particular, the present invention is in the field of aircraft lights with refractive optical structures.

BACKGROUND

Almost all aircraft are equipped with aircraft lights, including exterior aircraft lights, which are installed on the outside of the aircraft, and interior aircraft lights, which are installed within the aircraft. Exterior aircraft lights may include navigation lights, white anti-collision strobe lights, red-flashing beacon lights, take-off lights, taxi lights, runway turn-off lights, landing lights, logo lights, cargo loading lights, wing scan lights, engine scan lights, and search lights. Interior aircraft lights may include cabin illumination lights, washroom illumination lights, galley illumination lights, aisle guidance lights, passenger reading lights, and exit sign lights.

Such aircraft lights may comprise a light source and an overmolded optic, which encloses the light source. The overmolded optic may shape the light output, which is emitted by the aircraft light, when the light source is activated. Additionally, the overmolded optic may protect the light source from adverse external influences. The light output shaping capabilities of the overmolded optic are not always satisfactory.

It would be beneficial to provide an aircraft light whose optical system has enhanced light output shaping capabilities, while being easy to assemble.

SUMMARY

According to an exemplary embodiment of the invention, an aircraft light comprises a support and a light source, which is arranged on the support.

The support may be a support board, in particular a printed circuit board comprising electrical lines for supplying electric power to the light source. The light source may be an LED, or it may comprise at least one LED.

The aircraft light further comprises a first optical element and a second optical element. The first and second optical elements are at least partially light transmissive, allowing light, which is emitted by the light source, to pass through the first and second optical elements.

The first and second optical elements being at least partially light transmissive means that each of the first and second optical elements comprises at least one portion, which is light transmissive. Neither the first optical element nor the second optical element needs to be light transmissive everywhere. In other words, each of the first and second optical elements may comprise at least one portion, which is opaque and not light transmissive.

The first optical element is arranged at least partially over the light source, covering the light source, and is fixed to the support board. The first and second optical elements are arranged so that the first optical element is interposed between the light source and the second optical element, so that at least a portion of light, which is emitted by the light source, when activated, passes through the first optical element and through the second optical element.

As a result of the first optical element being interposed between the light source and the second optical element, at least a portion of light, which is emitted by the light source, when the light source is activated, enters the first optical element, passes through the first optical element, and then enters the second optical element after leaving the first optical element. Thus, the term interposed is to be understood as the first optical element being interposed between the light source and the second optical element by being arranged in the path of light between the light source and the second optical element.

The first optical element being interposed between the light source and the second optical element may further include that the first optical element is arranged at a spatial position between the light source and the second optical element.

In an aircraft light according to an exemplary embodiment of the invention, the first optical element has a first engagement portion and the second optical element has a second engagement portion. When the second optical element is mounted to the first optical element, the first engagement portion and the second engagement portion establish a positive fit.

In consequence, the second optical element may be fixed to the support board via the first optical element by establishing the positive fit between the first optical element and the second optical element.

Establishing the positive fit between the first optical element and the second optical element results in a positive mechanical engagement between the first and second optical elements.

The second engagement portion provided at the second optical element is in particular configured for fixing the second optical element to the first optical element by engaging with the first engagement portion of the first optical element, so that at least a portion of light, which is emitted by the light source, passes via the first optical element into the second optical element, when the second optical element is fixed to the first optical element.

In an aircraft light according to an exemplary embodiment of the invention, at least a portion of the light, which is emitted by the light source, passes a plurality of optical boundaries, which are formed by the inner and/or outer surfaces of the first and second optical elements.

The surfaces of the first and second optical elements may contact each other, forming an optical boundary between the first and second optical elements.

As an alternative to a direct contact between the first and second optical elements, an air filled gap may be formed between the outer surface of the first optical element and the inner surface of the second optical element, thus providing two optical boundaries, namely a first optical boundary between the first optical element and the air filled gap and a second optical boundary between the air filled gap and the second optical element.

The first and second optical elements may be formed so that they comprise portions, which contact each other, and that they comprise other portions, in which a gap is formed between the first and second optical elements.

By providing multiple optical boundaries along the path of the light from the light source through the first and second optical elements, the light from the light source may be refracted multiple times between the light source and the environment of the aircraft light. This may result in enhanced light output shaping capabilities of the aircraft light. In consequence, a desired light output of the aircraft light may be achieved with relatively small first and second optical elements. Thus, the dimensions of the aircraft light may be reduced, and a small but still efficient aircraft light may be provided.

Further, fixing the second optical element to the first optical element by establishing a positive fit between the first optical element and the second optical element may contribute to a convenient assembly of the aircraft light. It may avoid the need for using additional components for supporting and fixing the second optical element, such as screws. As a result, the mechanical structure of the aircraft light may be kept simple, and the costs for producing and assembling the aircraft light may be kept low.

In an embodiment, the first engagement portion and the second engagement portion establish a peripheral positive fit, such as a positive fit along the outer periphery of the first engagement portion, between the first optical element and the second optical element. Such a peripheral positive fit may enable an effective mounting and fixing of the second optical element to the first optical element. It may further allow for forming a hollow space between the first optical element and the second optical element, which is present towards the inside of said peripheral positive fit.

The formation of a hollow space, which may be filled with air, between the first optical element and the second optical element provides additional optical boundaries along the path of light, emitted by the light source. This may result in an even larger flexibility in the light output forming capabilities of the aircraft light.

In an embodiment, the positive fit may be continuous along the periphery of the first and second engagement portions.

In an alternative embodiment, the positive fit between the first and second engagement portions may be broken/interrupted, so that the first and second engagement portions comprise one or more gaps between a plurality of partial engagement portions, which are formed along the peripheries of the first and second engagement portions.

In an embodiment, at least one of the first optical element and the second optical element is at least partially elastic. In particular, at least one of the first optical element and the second optical element may be elastic at least at its engagement portion. At least one of the first optical element and the second optical element may in particular be at least partially or even fully made of a flexible material. An elasticity of the engagement portion may facilitate engaging the two engagement portions with each other, in particular by passing one of the engagement portions over the other engagement portion.

In an embodiment, the first optical element is at least partially made of a material comprising solidified liquid silicon rubber.

In an embodiment, the second optical element is made of a flexible material, in particular from a material comprising solidified liquid silicon rubber, or from a rigid material, such as polymethyl methacrylate (PMMA), polycarbonate (PC), or glass.

Using a flexible material may facilitate the assembly of the first and second optical elements. A second optical element, which is made from a rigid material, may provide enhanced protection against adverse external mechanical influences, such as mechanical impact.

In an embodiment, the first engagement portion has a so called "dovetail"-configuration, in which the first engagement portion comprises at least one outwards slanted first engagement surface, and the second engagement portion comprises at least one mating second engagement surface. The first and second engagement surfaces may abut against each other constituting a positive fit, which fixes the second optical element to the first optical element, when the first and second engagement portions are in engagement with each other.

In an alternative embodiment, the first engagement portion comprises at least one inwards slanted first engagement surface and the second engagement portion comprises at least one mating inwards slanted second engagement surface.

In an embodiment, the slanted first and second engagement surfaces are slanted at an angle $\alpha$ of between 70° and 85°, in particular at an angle $\alpha$ of between 70° and 85°, with respect to the support board. Slanting the first and second engagement surfaces at an angle within said value range has been found to provide a reliable mechanical connection between the first and second optical elements and to allow a convenient engagement and disengagement of the second engagement portion with/from the first engagement portion.

In an embodiment, the second optical element is arranged outside the first optical element and encompasses/surrounds the first optical element, when the second optical element is mounted to the first optical element.

In an alternative embodiment, the second optical element is arranged at least partially within the first optical element, so that the first engagement portion of the first optical element embraces the second engagement portion of the second optical element for fixing the second optical element to the first optical element.

In an embodiment, the first engagement portion has a first annular engagement surface and the second engagement portion has a second annular engagement surface. An engagement between first and second annular engagement surfaces may allow for a highly uniform distribution of the engagement forces around the engagement portions. Also, a highly uniform light output shaping around the periphery of the aircraft light may be achieved in this way.

In an embodiment, the first engagement portion has a plurality of substantially planar first engagement surfaces and the second engagement portion has a plurality of substantially planar second engagement surfaces. The first engagement surfaces may be arranged next to each other, forming a continuous or interrupted first engagement portion, which has a first polygonal configuration. The second engagement surfaces may be arranged next to each other, forming a continuous or interrupted second engagement portion, which has a second polygonal configuration, matching the configuration of the first engagement portion.

The polygonal configuration may be a triangular configuration, a rectangular configuration, in particular a quadratic configuration, a hexagonal configuration, an octagonal configuration or a polygonal configuration comprising five, seven or more than eight surfaces.

In an embodiment, the first and second optical elements may be formed as longitudinal structures, each comprising two longitudinal engagement surfaces, which extend in a stripe-like manner along a longitudinal direction.

In an embodiment, the first engagement portion is part of a light exit surface of the first optical element and the second engagement portion is part of a light entry surface of the second optical element. When the first and second engagement portions abut against each other, an optical interface may be formed between the first and second engagement portions, and light, which passes from the first optical element into the second optical element, may be refracted at said optical interface.

In an embodiment, the first optical element has a first refractive index, and the second optical element has a second refractive index, which is different from the first refractive index. The refraction—or a potential reflection—of the light may be controlled by adjusting the refractive indices of the first and second optical elements. The refractive indices may be adjusted by selecting the materials, which are used for producing the first and second optical elements.

Additionally or alternatively, a gap, in particular an air filled gap, may be formed between the first and second optical elements. The formation of such a gap may result in refracting light, which passes through the first and second optical elements, at a first optical interface, which is formed between the first optical element and the gap, and a second optical interface, which is formed between the gap and the second optical element. In such an embodiment, the refraction of the light may be controlled by adjusting the refraction indices of the first and second optical elements and/or by changing the width of the gap, which is formed between the first and second optical elements.

In an embodiment, at least one lens structure is formed in at least one of the first and second optical elements. The first optical element may comprise a first lens structure and/or the second optical element may comprise a second lens structure. By forming at least one lens structure in at least one of the first and second optical elements, the light output, which is emitted by the aircraft light, when the light source is activated, may be shaped with a high degree of design freedom. For example, the light output, which is emitted by the aircraft light, may be focused very efficiently by passing the light through at least one lens structure, in particular by passing the light through two lens structures.

The lens structures may be refractive lens structures. The lens structures may also include reflective lens structures or reflective lens portions. In particular, a reflective lens structure, comprising at least one total internal reflection surface, may be formed in the second optical element.

In an embodiment, at least one of the first and second optical elements has rotational symmetry with respect to an axis of rotation. The light source may be positioned on said axis of rotation. Alternatively or additionally, the main direction of the light output, emitted by the aircraft light, may be oriented parallel to said axis of rotation.

The first optical element and/or the first engagement portion may be formed as a circular collar, which surrounds the light source.

In an embodiment, both, the first and second optical elements, have rotational symmetry, respectively. The first and second optical elements may be arranged coaxially with respect to each other on a common axis. Such a configuration may result in an aircraft light having rotational symmetry. Forming both, the first and second optical elements, with rotational symmetry may contribute to an effective engagement and disengagement of the first and second optical elements with respect to each other. It may further allow for providing a light output, which has rotational symmetry with respect to the common axis.

In an embodiment, a clearance is present between the second optical element and the support board, when the second optical element is mounted to the first optical element. Such a clearance may facilitate mounting the second optical element to the first optical element by allowing the second optical element to "overshoot", i.e. to move beyond, its final mounting position during the process of mounting the second optical element to the first optical element. Such an "overshooting" of the second optical element beyond its final position may allow the flexible portion(s) of the first and/or second optical element to deform effectively for allowing the first and second engagement portions to engage which each other.

The clearance between the second optical element and the support board may be in the range of between 0.25 mm and 1.5 mm, in particular in the range of between 0.5 mm and 1.0 mm, more particularly in the range of between 0.6 mm and 0.8 mm.

In a virtual plane, which is oriented parallel to the support board, the first optical element may have a diameter in the range of between 5 mm and 20 mm, in particular a diameter in the range of between 8 mm and 15 mm, more particularly a diameter of between 10 mm and 12 mm.

In a direction, which is oriented perpendicular to the support board, the first optical element may have a height in the range of between 2 mm and 8 mm, in particular a height in the range of between 3 mm and 5 mm, more particularly a height of about 4 mm.

In the virtual plane, which is oriented parallel to the support board, the second optical element may have a diameter in the range of between 10 mm and 30 mm, in particular a diameter in the range of between 15 mm and 25 mm, more particularly a diameter of about 20 mm.

In a direction, which is oriented perpendicular to the support board, the second optical element may have a height in the range of between 5 mm and 30 mm, in particular a height in the range of between 10 mm and 20 mm, more particularly a height in the range of between 12 mm and 17 mm.

The minimum wall thickness of the first and second optical elements may be in the range of between 1 mm and 6 mm, in particular in the range of between 2 mm and 4 mm.

The aircraft light may be an exterior aircraft light, which is mounted to the outside of an aircraft, in particular to a fuselage, to a wing, to a stabilizer or to a running gear of the aircraft. The aircraft light may in particular be at least one of a navigation light, a white anti-collision strobe light, a red-flashing beacon light, a take-off light, a taxi light, a runway turn-off light, a landing light, a logo light, a cargo loading light, a wing scan light, an engine scan light, and a search light. The expression of the aircraft light being at least one of a navigation light, a white anti-collision strobe light, a red-flashing beacon light, a take-off light, a taxi light, a runway turn-off light, a landing light, a logo light, a cargo loading light, a wing scan light, an engine scan light, and a search light means that the aircraft light has the functionality of at least one of a navigation light, a white anti-collision strobe light, a red-flashing beacon light, a take-off light, a taxi light, a runway turn-off light, a landing light, a logo light, a cargo loading light, a wing scan light, an engine scan light, and a search light. The aircraft light may be a multi-purpose exterior aircraft light, combining any subset of the stated functionalities.

The aircraft light may also be an interior aircraft light, which is mounted inside an aircraft. The aircraft light may in particular be at least one of a cabin illumination light, a washroom illumination light, a galley illumination light, an aisle guidance light, a passenger reading light, and an exit sign light. The expression of the aircraft light being at least one of a cabin illumination light, a washroom illumination light, a galley illumination light, an aisle guidance light, a passenger reading light and an exit sign light means that the aircraft light has the functionality of at least one of a cabin illumination light, a washroom illumination light, a galley illumination light, an aisle guidance light, a passenger reading light and an exit sign light. The aircraft light may be a multi-purpose interior aircraft light, combining any subset of the stated functionalities.

Exemplary embodiments of the invention further include an aircraft, such as an airplane or a rotorcraft, which is equipped with at least one aircraft light according to an exemplary embodiment of the invention. The additional features, modifications and effects, described above with respect to the exemplary embodiments of the aircraft light, apply to the aircraft in an analogous manner. The aircraft may be a passenger aircraft, such as a passenger airplane. The rotorcraft may be a helicopter or an unmanned aerial vehicle.

Exemplary embodiments of the invention also include a method of assembling an aircraft light according to an exemplary embodiment of the invention, wherein the method includes elastically deforming at least one of the first engagement portion of the first optical element and the second engagement portion of the second optical element and mounting and fixing the second optical element to the first optical element by establishing a positive fit between the first and second engagement portions of the first and second optical elements.

In an embodiment, the method of assembling an aircraft light further includes tilting and/or rotating the second optical element with respect to the first optical element for introducing the first engagement portion at least partially into the second optical element and establishing a positive fit between the first and second engagement portions of the first and second optical elements.

BRIEF DESCRIPTION OF THE DRAWINGS

Further exemplary embodiments of the invention are described below with respect to the accompanying drawings, wherein.

DETAILED DESCRIPTION

Figure 1:
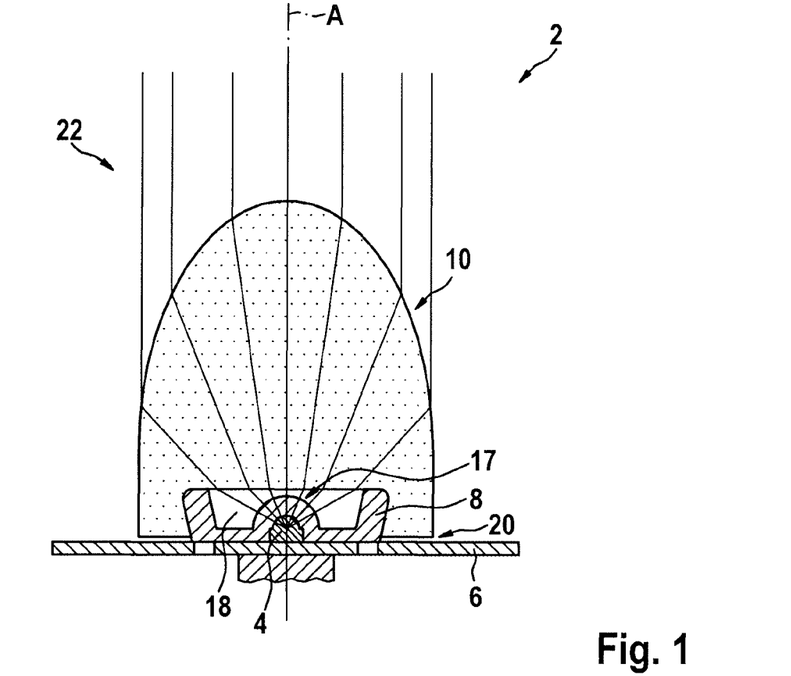
FIG. 1 depicts a schematic cross-sectional view through an aircraft light according to an exemplary embodiment of the invention.

FIG. 1 depicts a schematic cross-sectional view through an aircraft light 2 according to an exemplary embodiment of the invention.

The aircraft light 2 comprises a light source 4, which is arranged on a support board 6, for example a circuit board, in particular a printed circuit board ("PCB").

The light source 4 may be an LED, or it may comprise an LED or a plurality of LEDs.

The aircraft light 2 further comprises a first optical element 8, which is at least partially light transmissive. The first optical element 8 is supported by the support board 6. The first optical element 8 is in particular fixed to the support board 6. The first optical element 8 is arranged at least partially over the light source 4, covering the light source 4, so that at least a portion of the light, which is emitted by the light source 4, when it is activated, passes through the first optical element 8.

Figure 2:
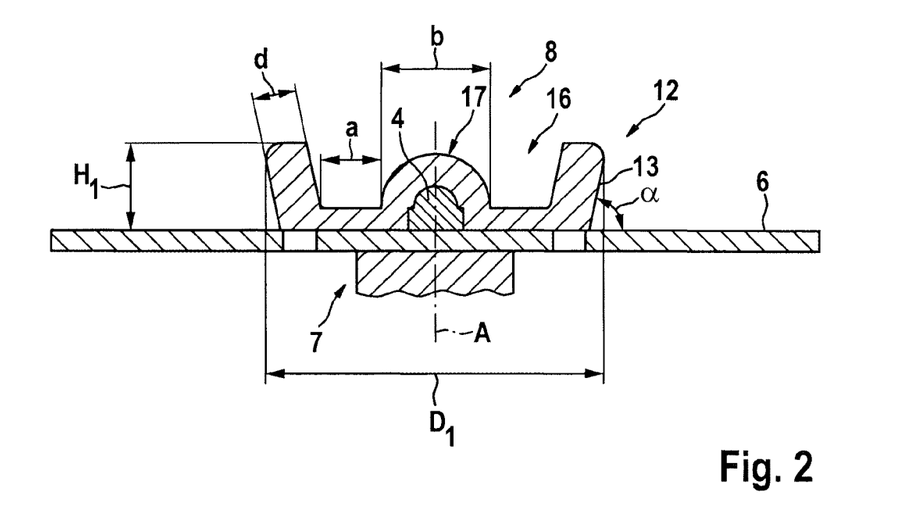
FIG. 2 depicts an enlarged schematic cross-sectional view of a light source, a first optical element and a support board of the aircraft light, which is depicted in FIG. 1.
Figure 3:
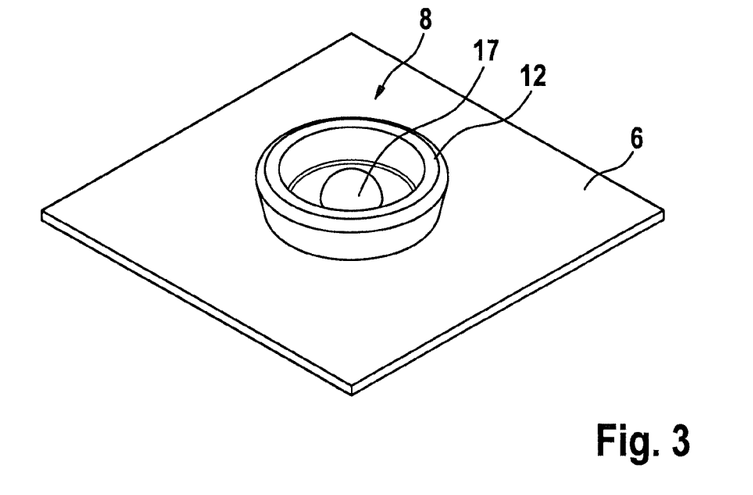
FIG. 3 depicts a schematic perspective view of the light source, the first optical element and the support board, which are depicted in FIG. 2.

FIG. 2 depicts an enlarged schematic cross-sectional view of the light source 4, the first optical element 8 and the support board 6, and FIG. 3 depicts a schematic perspective view thereof.

The aircraft light 2 also comprises a second optical element 10, which is at least partially light transmissive.

The first and second optical elements 8, 10 being at least partially light transmissive means that each of the first and second optical elements 8, 10 comprises at least one portion, which is light transmissive. Neither the first nor the second optical element 8, 10 needs to be light transmissive everywhere. In other words, each of the first and second optical elements 8, 10 may comprise at least one portion, which is not light transmissive.

Figure 4:
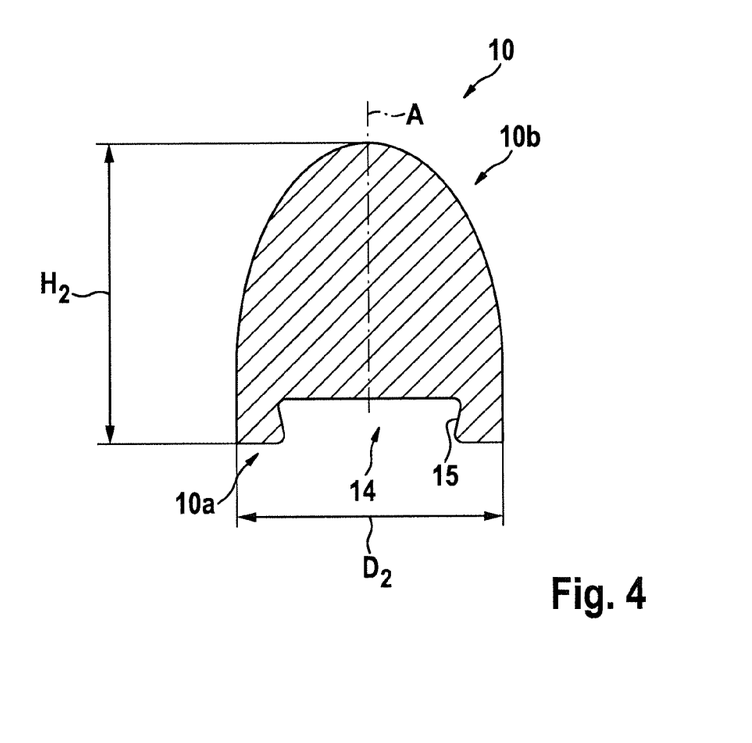
FIG. 4 depicts a schematic cross-sectional view of a second optical element of the aircraft light, which is depicted in FIG. 1.

FIG. 4 depicts a schematic cross-sectional view of the second optical element 10. The second optical element 10 has a dome-like shape with an underside 10a and a convex light emission surface 10b, which extends in a dome-shape manner from the outer periphery of the underside 10a. The underside 10a of the second optical element 10 faces the support board 6, when the second optical element 10 is mounted to the first optical element 8, as it is depicted in FIG. 1.

The first optical element 8 has a first engagement portion 12 (see FIG. 2), and the second optical element 10 has a mating second engagement portion 14. The first engagement portion 12 and the second engagement portion 14 are configured for establishing a positive fit between the first optical element 8 and the second optical element 10. The positive fit results in a positive mechanical engagement between the first optical element 8 and the second optical element 10, which fixes the second optical element 10 to the first optical element 8. In consequence, the second optical element 10, when fixed to the first optical element 8, is indirectly fixed to the support board 6 via the first optical element 8.

As illustrated in FIG. 1, the first optical element 8 is interposed between the light source 4 and the second optical element 10, when the second optical element 10 is fixed to the first optical element 8.

With the first optical element 8 being interposed between the light source 4 and the second optical element 10, at least a portion of the light, which is emitted by the light source 4, when it is operated, enters the first optical element 8, passes through the first optical element 8, and then enters the second optical element 10 after leaving the first optical element 8. Thus, the term interposed is to be understood as the first optical element 8 being arranged in the path of light between the light source 4 and the second optical element 10.

The first optical element 8 being interposed between the light source 4 and the second optical element 10 may include that the first optical element 8 is arranged at a spatial position between the light source 4 and the second optical element 10, as it is depicted in FIG. 1.

The first optical element 8 may, in combination with the support board 6, surround and/or enclose the light source 4, as it is depicted in FIGS. 1 to 3, and the second optical element 10 may, in combination with the support board 6, surround and/or enclose the first optical element 8, as it is depicted in FIG. 1. As a result, the light source 4 and/or the first optical element 8 are separated and protected from the environment by the second optical element 10. The second optical element 10 may in particular be configured for protecting the light source 4 and/or the first optical element 8 from mechanical impact and/or from other adverse influences from the environment, such as water, dirt, and moisture.

The complete enclosure of the light source 4 and/or the first optical element 8 by the second optical element 10, however, is an optional feature. Embodiments in which the light source 4 and/or the first optical element 8 are not completely enclosed by the second optical element 10 are also considered as comprising a first optical element 8, which is interposed between the light source 4 and the second optical element 10.

The support board 6 may be formed as and/or may be attached to a heat sink 7 (see FIG. 2), which is configured for dissipating heat, which is produced when the light source 4 is operated.

In the exemplary embodiment depicted in the figures, the first engagement portion 12 has a so called "dovetail"-configuration, in which the first engagement portion 12 is slanted outwards with respect to a central axis through the light source 6. The first engagement portion 12 includes at least one outwards slanted first engagement surface 13. The second engagement portion 14 comprises at least one mating outwards slanted second engagement surface 15, which is formed as part of an undercut within the second optical element 10 (see FIGS. 1 and 4).

In an alternative configuration, which is not explicitly shown in the figures, the first engagement portion 12 may comprise at least one inwards slanted first engagement surface, and the second engagement portion 14 may comprises at least one mating inwards slanted second engagement surface.

In the exemplary embodiment depicted in FIGS. 1 to 4, the second optical element 10 is arranged outside the first optical element 8 and encompass the first optical element 8, when the second optical element 10 is mounted to the first optical element 8.

In an alternative embodiment, which is not explicitly shown in the figures, the second optical element 10 may be arranged partially within the first optical element 8, so that the first engagement portion 12 of the first optical element 8 embraces the second engagement portion 14 of the second optical element 10 for fixing the second optical element 10 to the first optical element 8.

In the depicted exemplary embodiment of FIGS. 1 to 4, the slanted first and second engagement surfaces 13, 15 may be slanted at an angle α of between 70° and 85°, in particular at an angle of between 70° and 85°, with respect to the support board 6.

As best seen in the perspective view, which is depicted in FIG. 4, the first engagement portion 12 may be formed as a circular collar, surrounding the light source 4.

In such a configuration, the first and second optical elements 8, 10 may have rotational symmetry with respect to an axis A, which extends perpendicular to the support board 6. The light source 4 may be located on the axis A at the center of the aircraft light 2.

In the exemplary embodiment depicted in FIGS. 1 to 4, the first and second engagement surfaces 13, 15 are annular engagement surfaces. They extend continuously around the center of the aircraft light 2. The first and second annular engagement surfaces 13, 15 may in particular extend along a circle, which is centered around the axis A. Alternatively, the first and second annular engagement surfaces 13, 15 may extend along an elliptical path or along another curved path, as long as the curved shapes of the first and second annular engagement surfaces 13, 15 match.

In an alternative embodiment, which is not explicitly shown in the figures, the first optical element 8 may have a polygonal periphery. In such an embodiment, the first engagement portion 12 may include a plurality of substantially planar first engagement surfaces, which, in combination, form the polygonal periphery of the first optical element 8.

In such an embodiment, the second engagement portion 14 may be formed with an equal number of mating substantially planar second engagement surfaces. When the second engagement portion 14 is mounted to the first engagement portion 12, the first engagement surfaces of the first engagement portion 12 may engage with the corresponding second engagement surfaces, which are formed at the second engagement portion 14.

In yet another embodiment, the first and second optical elements 8, 10 may be formed as longitudinal structures, each comprising two longitudinal engagement surfaces, which extend in a stripe-like manner along a longitudinal direction.

In the embodiment shown in FIGS. 1 to 4, a continuous contact is established between the first and second engagement surfaces 13, 15, when the second optical element 10 is mounted to the first optical element 8.

In alternative embodiments, the first and second engagement portions 12, 14 may comprise a plurality of first and second engagement surfaces 13, 15, respectively. Gaps may be formed between adjacent engagement surfaces 13, 15, such that, contrary to the exemplary embodiment depicted in FIGS. 1 to 4, no continuous engagement is established between the first and second optical elements 8, 10 along the circumference of the first and second engagement portions 12, 14, when the second optical element 10 is mounted to the first optical element 8. Instead, in such a configuration, a plurality of contact zones, at which the first and second engagement portions 12, 14 engage with each other, may be formed along the circumference of the first and second engagement portions 12, 14, when the second optical element 10 is mounted to the first optical element 8.

The at least one first engagement surface 13 may be or may be part of a light exit surface of the first optical element 8, and the second engagement surface 15 may be or may be part of a light entry surface of the second optical element 10.

The portions, in which the first engagement surface 13 and the second engagement surface 15 of the first and second optical elements 8, 10 contact each other, constitute optical boundaries, which may cause a refraction of the light, which is emitted by the light source 4 and passes through the first and second optical elements 8, 10.

The first optical element 8, which is depicted in FIGS. 1 to 4, comprises an inner portion 17, which is formed in a dome-like shape covering the light source 4. A gap 16 is formed between the inner portion 17 and the circular first engagement portion 12, which surrounds the inner portion 17 in a distance a.

The distance a between the inner portion 17 and the annular first engagement portion 12 may be in the range of between 3 mm and 10 mm.

Said gap 16 between the inner portion 17 and the annular first engagement portion 12 results in the formation of a hollow, usually air filled, space 18 between the first and second optical elements 8, 10, when the second optical element 10 is mounted to the first optical element 8.

The surfaces of the first and second optical elements 8, 10, which define the hollow space 18, provide additional optical boundaries for refracting light, which is emitted by the light source 4 and passes through the first optical element 8, through the hollow space 18, and through the second optical element 10.

The surfaces of the first and second optical elements 8, 10, which define the hollow space 18 and constitute the optical boundaries, may be shaped such that the refraction of the light at the optical boundaries results in a desired light output, which is emitted by the aircraft light 2, when the light source 4 is activated. An example of a light output of an aircraft light 2 according to an exemplary embodiment of the invention is indicated schematically by the light rays 22 depicted in FIG. 1.

The first optical element 8 has a first refractive index and the second optical element 10 has a second refractive index. The refractive indices of the first and second optical elements 8, 10 are defined by the materials, which are used for forming the first and second optical elements 8, 10. For controlling and enhancing the refraction of light at the optical boundaries of the first and second optical elements 8, 10, the materials of the first and second optical elements 8, 10 may be chosen so that the second refractive index differs from the first refractive index.

The inner portion 17 or another portion of the first optical element 8 may be formed as a first lens structure for focusing the light, which passes through the first optical element 8. Additionally or alternatively, the second optical element 10 may be formed as a second lens structure.

The first and second optical elements 8, 10 and, in particular the lens structures formed in the first and second optical elements 8, 10, may be refractive optical elements. The first and second optical elements 8, 10 may also comprise at least one total internal reflection surface, which is configured such that the light, which is incident on said surface from inside the respective optical element, does not exit from the optical element, but is totally reflected at said at least one total internal reflection surface.

At least one of the first optical element 8 and the second optical element 10 may be made at least partly of an elastic material. In particular, at least one of the first and second engagement portions 12, 14 of the first and second optical elements 8, 10 may be made from an elastic material, in order to enable deforming at least one of the first and second engagement portions 12, 14.

Deforming at least one of the first and second engagement portions 12, 14 may allow for or facilitate a convenient engaging of the first and second engagement portions 12, 14 with each other.

In the exemplary embodiment depicted in FIGS. 1 to 4, the second optical element 10 may be fixed to the first optical element 8 by deforming at least one of the first and second engagement portions 12, 14, in order to allow passing the second engagement portion 14 over the first engagement portion 12, so that the first engagement portion 12 may be introduced into the undercut, which is formed as part of the second engagement portion 14.

The first optical element 8 may, for example, be at least partially made of a material comprising a solidified liquid silicon rubber. The second optical element 10 may, for example, be at least partially made of a material comprising a solidified liquid silicon rubber, or from a rigid material, such as polymethyl methacrylate (PMMA), polycarbonate (PC), or glass.

The dimensions of the first and second optical elements 8, 10 may be set such that there is a clearance 20, i.e., a vertical gap, between the underside 10a of the second optical element 10 and the support board 6, when the second optical element 10 is mounted to the first optical element 8. Such a clearance 20 may make the mounting of the second optical element 10 to the first optical element 8 easier by allowing the second optical element 10 to "overshoot" its final mounted position during the process of mounting the second optical element 10 to the first optical element 8. Such an "overshooting" of the second optical element 10 beyond its final position may help the flexible portion(s) of the first and second optical elements 8, 10 to deform sufficiently for allowing the first and second engagement portions 12, 14 to engage which each other.

The clearance 20 between the second optical element 10 and the support board may be in the range of between 0.25 mm and 1.5 mm, in particular in the range of between 0.5 mm and 1.0 mm, more particularly in the range of between 0.6 mm and 0.8 mm.

In a virtual plane, which is oriented parallel to the support board 6, the first optical element 8 may have a diameter D1 in the range of between 5 mm and 20 mm, in particular a diameter D1 in the range of between 8 mm and 15 mm, more particularly a diameter D1 of between 10 mm and 12 mm.

In a direction, which is oriented perpendicular to the support board 6, i.e. in a direction, which is parallel to the axis A, the first optical element 8 may have a height H1 in the range of between 2 mm and 8 mm, in particular a height H1 in the range of between 3 mm and 5 mm, more particularly a height H1 of about 4 mm.

The inner portion 17 of the first optical element 8 may have a diameter b in the range of between 1 mm and 5 mm, in particular a diameter b in the range of between 2 mm and 4 mm, more particularly a diameter b of about 3 mm.

In a virtual plane, which is oriented parallel to the support board 6, the second optical element 10 may have a diameter D2 in the range of between 10 mm and 30 mm, in particular a diameter D2 in the range of between 15 mm and 25 mm, more particularly a diameter D2 of about 20 mm.

In a direction, which is oriented perpendicular to the support board 6, i.e. in a direction, which is parallel to the axis A, the second optical element 10 may have a height H2 in the range of between 5 mm and 30 mm, in particular a height H2 in the range of between 10 mm and 20 mm, more particularly a height H2 in the range of between 12 mm and 17 mm.

The minimum wall thickness of the first and second optical elements 8, 10 may be in the range of between 1 mm and 6 mm, in particular in the range of between 2 mm and 4 mm.

Figure 5:
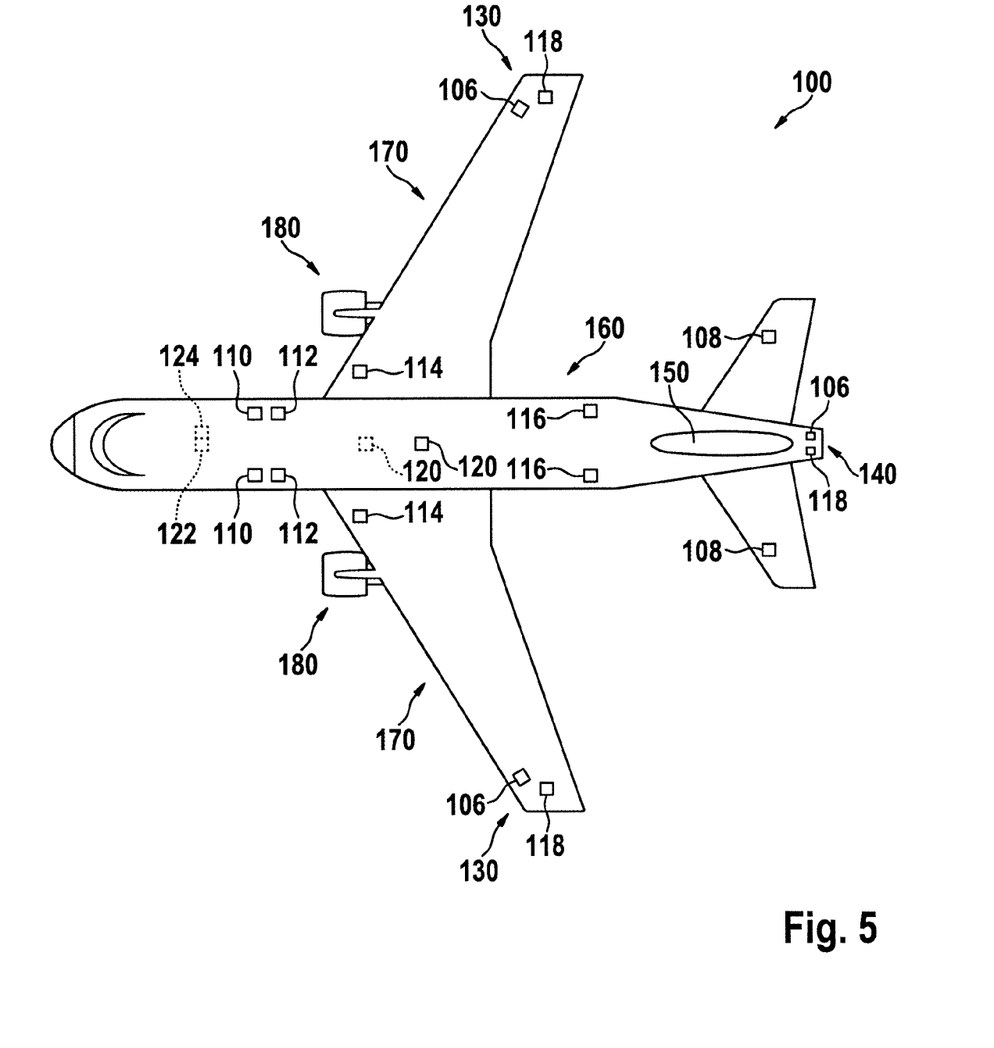
FIG. 5 depicts a schematic top view of an aircraft, in particular of an airplane, which is equipped with exterior aircraft lights according to exemplary embodiments of the invention.

FIG. 5 shows a schematic top view of an aircraft 100, in particular of a passenger airplane 100, from a position above the aircraft 100. The aircraft 100 is equipped with a variety of exterior aircraft lights 106-124.

Each of the exterior aircraft lights 106-124 may be provided as an aircraft light 2 according to an exemplary embodiment of the invention, as it has been described before. However, not all of the exterior aircraft lights 106-124 need to be aircraft lights 2 according to exemplary embodiments of the invention. The aircraft 100 may in particular comprise a mixture of exterior aircraft lights according to exemplary embodiments of the invention and other types of exterior aircraft lights.

The exemplary aircraft 100 depicted in FIG. 5 is equipped with three navigation lights 106, two logo lights 108, two wing scan lights 110, two engine scan lights 112, two runway turnoff lights 114, two cargo loading lights 116, three white anti-collision strobe lights 118, two red-flashing anti-collision beacon lights 120, a landing light 122, and a take-off light 124.

It is pointed out that these kinds of lights and their numbers are exemplary only. The aircraft 100 does not need to be equipped with all the exterior aircraft lights 106-124, which are depicted in FIG. 5, and the aircraft 100 may have additional lights, such as taxi lights, which are not shown in FIG. 5.

The three navigation lights 106 are positioned in the left and right wing tips 130 as well as in the tail 140 of the aircraft 100. In normal flight conditions, each one of the navigation lights 106 emits light in one of the colors green, red and white, thus indicating to the aircraft environment if they are looking at the port side, starboard side or tail side of the aircraft 100. The navigation lights 106 are normally switched on during all phases of the flight and in all flight conditions.

The logo lights 108 are directed to the vertical stabilizer 150 of the aircraft 100 and are provided for illuminating the same, in particular for illuminating the logo (not shown), which is commonly provided on the vertical stabilizer 150. The logo lights 108 are normally switched on for the entire duration of the flight during night flights. It is also possible that the logo lights 108 are only used during taxiing on the airport and are normally switched off during the flight.

The wing scan lights 110 and the engine scan lights 112 are positioned on the left and right sides of the aircraft fuselage 160, in front of the roots of the wings 170 of the aircraft 100. The wing scan lights 110 and the engine scan lights 112 are normally off during the flight and may be switched on periodically or upon reasonable cause by the pilots or by the aircrew, in order to check the wings 170 and the engines 180 of the aircraft 100.

The runway turn-off lights 114 are positioned in the roots of the wings 170. They are directed forwards and are normally switched off during the flight and switched on during taxiing, at least at night. The cargo loading lights 116 are positioned on the left and right sides of the aircraft fuselage 160, behind the wings 170 and in front of the tail structure of the aircraft 100. They are normally switched off during the flight of the aircraft 100.

The white anti-collision strobe lights 118 are positioned in the left and right wing tips 130 as well as at the tail 140 of the aircraft 100. The white anti-collision strobe lights 118 emit respective sequences of white light flashes during normal operation of the aircraft 100. It is also possible that the white anti-collision strobe lights 118 are only operated during night and in bad weather conditions.

The anti-collision beacon lights 120 are positioned on the top and the bottom of the aircraft fuselage 160. They are arranged at the height of the wings 170 in the longitudinal direction of the aircraft 100. While one of the anti-collision beacon lights 120 is disposed on the top of the aircraft fuselage 160, the other one of the anti-collision beacon lights 120 is disposed on the bottom of the aircraft fuselage 160 and is therefore shown in phantom. The anti-collision beacon lights 120 are normally switched on during the flight. Their output is perceived as a sequence of red light flashes in a given viewing direction.

The landing light 122 and the take-off light 124 are attached to the front running gear (not shown) of the aircraft 100, which is normally stored within the aircraft fuselage 160 and is deployed during landing, taxiing and take off. As the landing light 122 and the take-off light 124 are also arranged on the bottom of the aircraft 100, they are also shown in phantom in FIG. 5.

Figure 6:
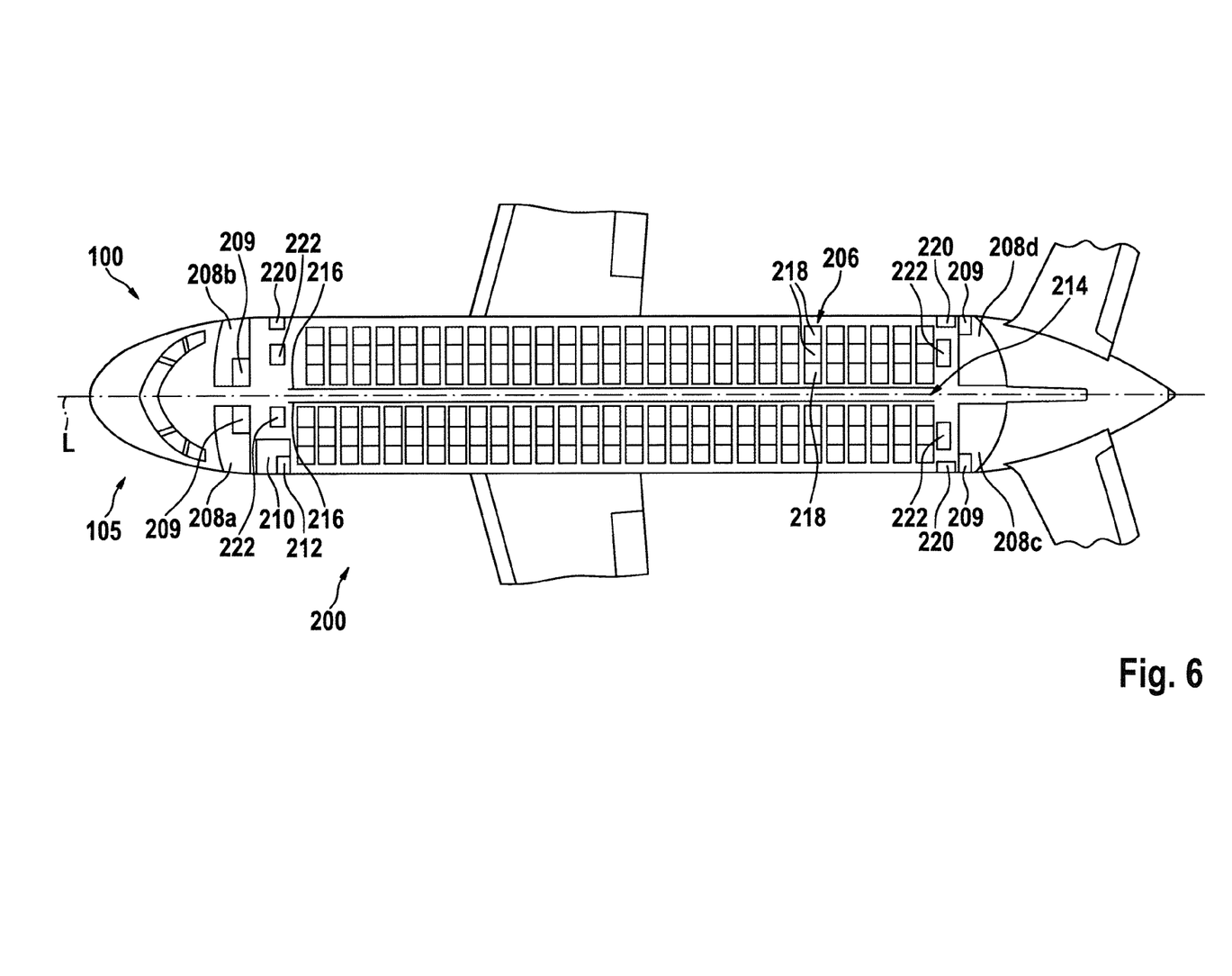
FIG. 6 depicts a schematic cut-open view of a passenger cabin of an aircraft, which is equipped with interior aircraft lights according to exemplary embodiments of the invention.

FIG. 6 depicts a schematic cut-open view of an aircraft 100 in accordance with an exemplary embodiment of the invention, depicting a cockpit 105 and a passenger cabin 200, which is also referred to as aircraft passenger cabin 200.

The aircraft passenger cabin 200 is equipped with a plurality of passenger seats 206. The passenger seats 206 are arranged next to each other forming a plurality of passenger seat rows. Each passenger seat row comprises two groups of passenger seats 206, respectively including three passenger seats 206. The two groups of passenger seats 206 are separated from each other by a center aisle 214, which extends along a longitudinal axis L of the aircraft 100.

Smaller aircraft may comprise less than three passenger seats 206 in each group of passenger seats 206. Larger aircraft 100 may comprise more than two groups of passenger seats 206 in each row, which are separated by a plurality of aisles 214 extending parallel to each other along or parallel to the longitudinal axis L of the aircraft 100.

The aircraft passenger cabin 200, which is depicted in FIG. 6, is further equipped with four lavatories 208a-208d. The lavatories 208a-208d are provided at four locations within the aircraft passenger cabin 200. A first lavatory 208a is located at the front portside end of the aircraft passenger cabin 200, a second lavatory 208b is located at the front starboard end of the aircraft passenger cabin 200, a third lavatory 208c is located at the rear portside end of the aircraft passenger cabin 200, and a fourth lavatory 208d is located at the rear starboard end of the aircraft passenger cabin 200. Additionally or alternatively, lavatories 208a-208d may be provided at other locations of the aircraft passenger cabin 200 as well.

The aircraft passenger cabin 200 is further equipped with a galley 210, in order to allow for preparing meals and drinks for the passengers.

Interior aircraft lights according to exemplary embodiments of the invention may be installed within the passenger cabin 200 as cabin illumination lights 222 for illuminating the passenger cabin 200.

At least one of the lavatories 208a-208d may be provided with an interior aircraft light according to an exemplary embodiment of the invention, which in this case serves as a washroom illumination light 209.

At least one interior aircraft light according to an exemplary embodiment of the invention may be employed in the galley 210 as a galley illumination light 212.

Interior aircraft lights according to exemplary embodiments of the invention may further be employed as aisle guidance lights 216, which extend along the aisle 214 between the passenger seats 206, and/or as exit sign lights 220 for indicating the exits of the aircraft 100.

Interior aircraft lights according to exemplary embodiments of the invention may also be installed as individually switchable personal passenger reading lights 218 above the passenger seats 206.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light comprising:
a support board;
a light source, arranged on the support board;
a first at least partially light transmissive optical element, which is arranged over the light source and which is fixed directly to the support board; and
a second at least partially light transmissive optical element;
wherein the first optical element is interposed between the light source and the second optical element;
wherein the first optical element has a first slanted engagement portion relative to the support board and the second optical element has a second engagement portion
wherein the first engagement portion and the second engagement portion establish a positive fit between the first optical element and the second optical element; and
wherein at least a portion of light, which is emitted by the light source in operation, passes through the first optical element and through the second optical element.

2. The aircraft light according to claim 1, wherein the first engagement portion and the second engagement portion establish a peripheral positive fit between the first optical element and the second optical element and wherein a hollow space is present towards the inside of said peripheral positive fit between the first optical element and the second optical element.

3. The aircraft light according to claim 1, wherein at least one of the first optical element and the second optical element is elastic, at least at the respective engagement portion.

4. The aircraft light according to claim 1,
wherein the first engagement portion comprises at least one outwards slanted first engagement surface and wherein the second engagement portion comprises at least one mating second engagement surface;
or
wherein the first engagement portion comprises at least one inwards slanted first engagement surface and wherein the second engagement portion comprises at least one mating second engagement surface.

5. The aircraft light according to claim 1, wherein the first engagement portion has a first annular engagement surface and the second engagement portion has a second annular engagement surface.

6. The aircraft light according to claim 1, wherein the first engagement portion has a plurality of substantially planar first engagement surfaces and the second engagement portion has a plurality of substantially planar second engagement surfaces.

7. The aircraft light according to claim 1, wherein the first engagement portion forms part of a light exit surface of the first optical element and the second engagement portion forms part of a light entry surface of the second optical element.

8. The aircraft light according to claim 1, wherein the first optical element comprises a first lens structure and/or wherein the second optical element comprises a second lens structure.

9. The aircraft light according to claim 8, wherein the first optical element has a first refractive index, and wherein the second optical element has a second refractive index, which is different from the first refractive index.

10. The aircraft light according to claim 1, wherein at least one of the first and second optical elements has rotational symmetry with respect to an axis of rotation (A), wherein the light source is in particular positioned on said axis of rotation (A).

11. The aircraft light according to claim 1, wherein a clearance is present between the second optical element and the support board, wherein the clearance is in particular in the range of between 0.5 mm and 1.0 mm.

12. The aircraft light according to claim 1, wherein the aircraft light is an exterior aircraft light, wherein the exterior aircraft light is in particular at least one of a navigation light, a white anti-collision strobe light, a red-flashing anti-collision beacon light, a take-off light, a taxi light, a runway turn-off light, a landing light, a logo light, a cargo loading light, a wing scan light, an engine scan light, and a search light.

13. The aircraft light according to claim 1, wherein the aircraft light is an interior aircraft light, wherein the aircraft light is in particular at least one of a cabin illumination light, a washroom illumination light, a galley illumination light, an aisle guidance light, a passenger reading light, and an exit sign light.

14. The aircraft, such as an airplane or a rotorcraft, comprising at least one aircraft light according to claim 1.

15. A method of assembling an aircraft light according to claim 1, wherein the method includes:
elastically deforming at least one of the first and second engagement portions and fixing the second optical element to the first optical element by establishing a positive fit between the first and second engagement portions of the first and second optical elements.

* * * * *